US012417128B2

(12) United States Patent
Vinson et al.

(10) Patent No.: US 12,417,128 B2
(45) Date of Patent: Sep. 16, 2025

(54) AUTOMATIC COMPUTE ENVIRONMENT SCHEDULING USING MACHINE LEARNING

(71) Applicant: Disney Enterprises, Inc., Burbank, CA (US)

(72) Inventors: Katherine S. Vinson, Santa Monica, CA (US); Jason Alexander Cox, Valencia, CA (US); Adam Arredondo, Mission Viejo, CA (US); Brian Lawrence Scott, Burbank, CA (US); Patrick O'Connor, Fontana, CA (US); James H. Tatum, Anaheim, CA (US); Steven Wagner, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 632 days.

(21) Appl. No.: 17/705,516

(22) Filed: Mar. 28, 2022

(65) Prior Publication Data
US 2023/0305901 A1 Sep. 28, 2023

(51) Int. Cl.
*G06F 9/50* (2006.01)
*G06F 9/48* (2006.01)
*G06N 20/00* (2019.01)

(52) U.S. Cl.
CPC .......... *G06F 9/5055* (2013.01); *G06F 9/4881* (2013.01); *G06N 20/00* (2019.01)

(58) Field of Classification Search
None
See application file for complete search history.

(56) References Cited

U.S. PATENT DOCUMENTS

2012/0271926 A1* 10/2012 Shakirzyanov ....... G06F 9/5072
    709/220
2017/0177063 A1*  6/2017 Ederbach .............. G06F 1/3231
(Continued)

FOREIGN PATENT DOCUMENTS

WO    2020197688 A1   10/2020

OTHER PUBLICATIONS

© 2022 Amazon Web Services, Inc., "Scheduled scaling for Amazon EC2 Auto Scaling", retrieved Feb. 24, 2022, 6 pages <https://docs.aws.amazon.com/autoscaling/ec2/userguide/schedule_time.html>.

(Continued)

*Primary Examiner* — Umut Onat
(74) *Attorney, Agent, or Firm* — Squire Patton Boggs LLP; Sarah Mirza (57) ABSTRACT

Various embodiments provide techniques for automatic compute environment scheduling using machine learning (ML). This includes identifying a first compute resource among a plurality of compute resources operating in a compute infrastructure, where the first compute resource is in a first operational state. It further includes determining, based on comparing a first time with a compute resources schedule generated using an ML model, that the first compute resource should be placed in a second operational state different from the first operational state. It further includes determining whether the compute resources schedule should be disregarded, and either (1) in response to determining that the compute resources schedule should not be disregarded, placing the first compute resource in the second operational state, or (2) in response to determining that the compute resources schedule should be disregarded, allowing the first compute resource to remain in the first operational state.

20 Claims, 7 Drawing Sheets

(56) References Cited

U.S. PATENT DOCUMENTS

| | | | |
|---|---|---|---|
| 2019/0026602 A1 | 1/2019 | Leng et al. | |
| 2019/0266014 A1* | 8/2019 | Bahl et al. | |
| 2020/0133471 A1* | 4/2020 | Sreenivasan | G06F 3/04886 |
| 2020/0302311 A1* | 9/2020 | Scheutz | G06F 9/45558 |
| 2020/0382520 A1* | 12/2020 | Hatfield | H04L 63/08 |
| 2021/0405991 A1* | 12/2021 | Parra | G06F 9/4406 |
| 2023/0205307 A1* | 6/2023 | Han | G06N 20/00 |
| | | | 713/320 |

OTHER PUBLICATIONS

© 2022 Amazon Web Services, Inc., "Predictive scaling for Amazon EC2 Auto Scaling", retrieved Mar. 2, 2022, 6 pages <https://docs.aws.amazon.com/autoscaling/ec2/userguide/ec2-auto-scaling-predictive-scaling.html>.

* cited by examiner

AUTOMATIC COMPUTE ENVIRONMENT SCHEDULING USING MACHINE LEARNING

BACKGROUND

Many businesses maintain multiple compute environments for their software applications. For example, a business may maintain a testing environment and a production environment. The testing environment is commonly used to validate and quality check changes to software applications before the software is deployed to production, where real users (e.g., internal or external users) can interact with the application.

These environments, however, can be cost and resource inefficient to maintain. For example, a business may maintain a testing environment 24 hours a day under the assumption that development and testing teams will need to use the environment at all hours. As another example, a business may maintain a production environment 24 hours a day under the assumption that users will access the production environment at all hours. In reality, these environments are often only needed during certain times of the day (e.g., when users are awake to access the environment). Running the environments outside of the times when the environments are actually necessary wastes compute resources and power, and can be unnecessarily expensive both computationally and monetarily (e.g., when compute resources are paid for based on operational time).

SUMMARY

Embodiments include a method. The method includes identifying a first compute resource among a plurality of compute resources operating in a compute infrastructure, where the first compute resource is in a first operational state. The method further includes determining, based on comparing a first time with a compute resources schedule generated using a machine learning (ML) model, that the first compute resource should be placed in a second operational state different from the first operational state. The method further includes determining whether the compute resources schedule should be disregarded, and (1) in response to determining that the compute resources schedule should not be disregarded, placing the first compute resource in the second operational state, or (2) in response to determining that the compute resources schedule should be disregarded, allowing the first compute resource to remain in the first operational state.

Embodiments further include a non-transitory computer-readable medium containing computer program code that, when executed by operation of one or more computer processors, performs operations. The operations include identifying a first compute resource among a plurality of compute resources operating in a compute infrastructure, where the first compute resource is in a first operational state. The operations further include determining, based on comparing a first time with a compute resources schedule generated using a machine learning (ML) model, that the first compute resource should be placed in a second operational state different from the first operational state. The operations further include determining whether the compute resources schedule should be disregarded, and (1) in response to determining that the compute resources schedule should not be disregarded, placing the first compute resource in the second operational state, or (2) in response to determining that the compute resources schedule should be disregarded, allowing the first compute resource to remain in the first operational state.

Embodiments further include a system. The system includes a computer processor and a memory having instructions stored thereon which, when executed on the computer processor, performs operations. The operations include identifying a first compute resource among a plurality of compute resources operating in a compute infrastructure, where the first compute resource is in a first operational state. The operations further include determining, based on comparing a first time with a compute resources schedule generated using a machine learning (ML) model, that the first compute resource should be placed in a second operational state different from the first operational state. The operations further include determining whether the compute resources schedule should be disregarded, and (1) in response to determining that the compute resources schedule should not be disregarded, placing the first compute resource in the second operational state, or (2) in response to determining that the compute resources schedule should be disregarded, allowing the first compute resource to remain in the first operational state.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Aspects of the present disclosure provide apparatuses, methods, processing systems, and non-transitory computer-readable mediums for automatic compute environment scheduling using machine learning (ML). In an embodiment, one or more disclosed techniques can be used to automatically, and selectively, decrease available compute resources in a pool of compute infrastructure when the compute resources are not needed. As used herein, decreasing compute resources or a decrease action refers to operations that place one or more compute resources in a deactivated operational state such as shutting down one or more compute resources, hibernating one or more compute resources, deallocating one or more compute resources, scaling down one or more compute resources, or the like. For example, an ML model (e.g., a trained ML model as discussed further below in relation to FIG. 7) can be used to generate a schedule for decreasing compute resources. The ML model can be trained to infer the schedule based on a variety of inputs, including regular work hours, holiday time, past usage patterns, and a variety of other suitable information, and it can be updated throughout operation based on actual usage of the compute resources. Further, the schedule can provide decrease and increase recommendations for particular compute resources and particular geographic regions. As used herein, increasing compute resources or an increase action refers to operations that place one or more compute resources in an activated operational state such as starting up one or more compute resources, restoring/reactivating one or more compute resources (e.g., from hibernation), reallocating one or more compute resources, scaling up one or more compute resources, or the like.

In an embodiment, any compute resources that have been decreased can be increased quickly, and with minimal effort (e.g., by a developer when needed). Further, users who seek access to the compute resource when it has been shut down or scaled down (e.g., outside of expected hours) can automatically request an override to increase the compute resources. In an embodiment, the override can restore the compute resources to a previous operational state (e.g., restoring the compute resources to the most recent state they were in when shut down) or can start up the compute resources fresh (e.g., with a fresh operational state). The ML model can take such override requests into account, along with user activity and any other suitable activity, to update the ML model.

Existing techniques may decrease or increase compute resources at a virtual machine level based on a manually created schedule. This has numerous disadvantages. Working at the virtual machine level makes scheduling significantly less robust and less adaptable. A virtual machine can be a host for various system components that developers may want to decrease and increase in isolation from one another. Further, a manually created schedule, or a schedule created using simple rules or paradigms, does not automatically adapt to changes in user needs, and therefore, can be less accurate than using an ML model as disclosed in one or more embodiments herein. By contrast, the apparatuses, methods, processing systems, and non-transitory computer-readable mediums for automatic compute environment scheduling using machine learning (ML) of the present disclosure provide numerous technical advantages. For example, working at a scheduler level (according to one or more techniques disclosed herein) allows for a flexible and powerful solution that can be tailored to schedule particular compute resources, in particular regions, to meet a variety of team needs. The scheduler can choose between various approaches to decreasing and increasing compute resources based on the type of resource. The ML model can more accurately predict when compute resources should be decreased, or increased. This conserves power and compute resources, by allowing unneeded compute resources to be decreased. It also improves software development, by allowing developers to rely on necessary resources being available without having to repeatedly request override (thus saving time and frustration).

As used in the present application, the terms "automatic," "automation," "automated," and "automating" refer to systems and processes that do not require the participation of a human user, such as a human system administrator. Although in some implementations a human system administrator may review the performance of the systems and methods disclosed herein, that human involvement is optional. Thus, the processes described in the present application may be performed under the control of hardware processing components of the disclosed systems.

Figure 1:
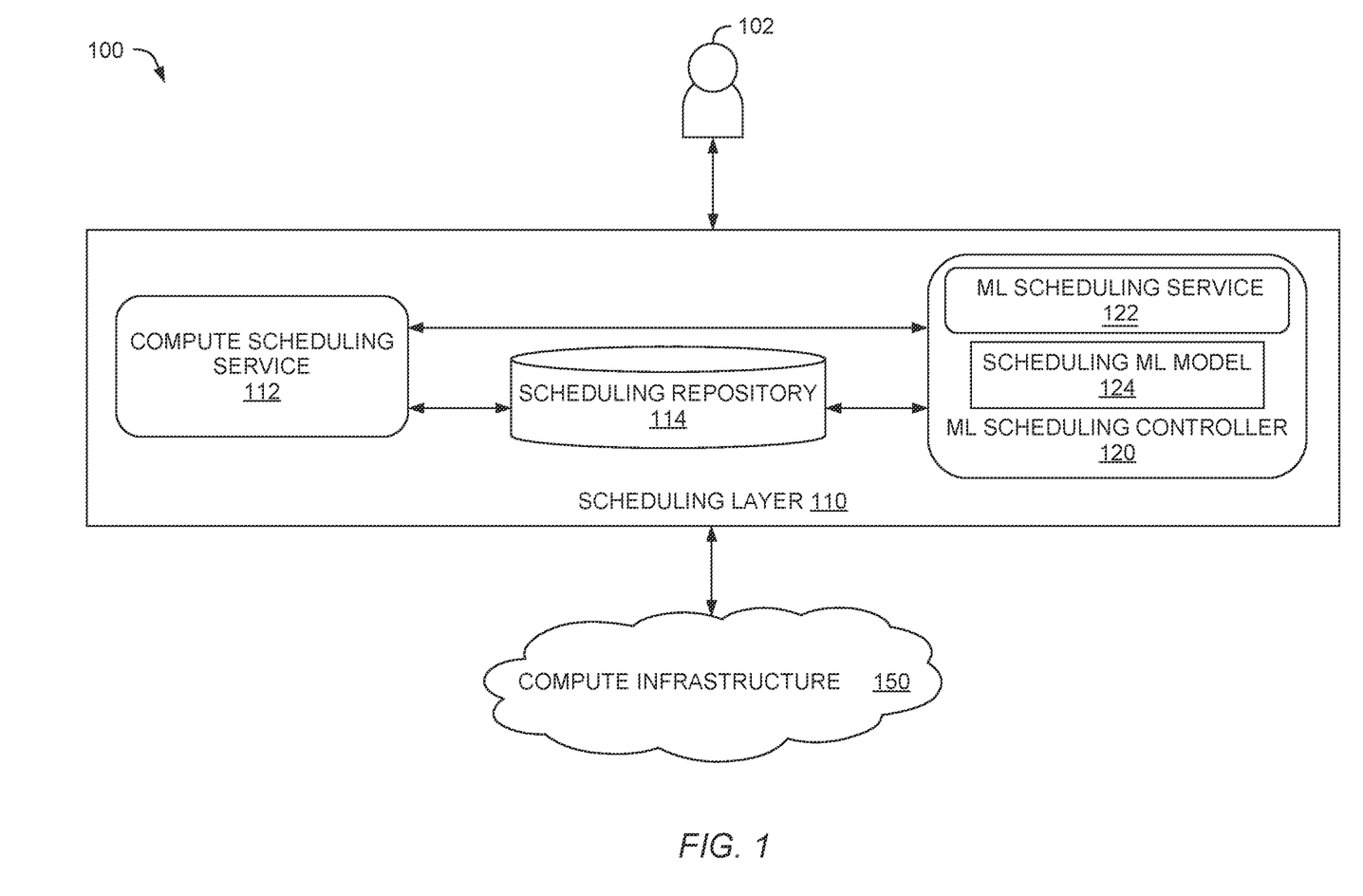
FIG. 1 illustrates a system for automatic compute environment scheduling using machine learning, according to an embodiment.

FIG. 1 illustrates a system 100 for automatic compute environment scheduling using machine learning, according to an embodiment. In an embodiment, a scheduling layer 110 is connected with one or more users 102 and a compute infrastructure 150. For example, the user 102 can be a developer or tester of software applications, or a user of software applications (e.g., internal users within an entity or external users outside of an entity). In an embodiment, the compute infrastructure 150 is a suitable cloud computing infrastructure (e.g., a public cloud, a private cloud, a hybrid cloud, or any other suitable cloud computing infrastructure). Alternatively, or in addition, the compute infrastructure 150 can be an on-premises compute infrastructure (e.g., a collection of on-premises servers) or any other suitable compute infrastructure.

In an embodiment the scheduling layer 110 is connected to the user 102 and the compute infrastructure 150 using a communication network. For example, the user 102 can interact with the scheduling layer 110 using a local area network (LAN), a wide area network (WAN), the Internet, or any other suitable communication network. Further, the user 102 and scheduling layer 110 can be connected to the communication network using any suitable network connection, including a wired connection (e.g., an Ethernet or fiber optic connection), a wireless connection (e.g., a WiFi connection), a cellular connection, or any other suitable network connection.

The scheduling layer 110 includes a compute scheduling service 112. In an embodiment, the compute scheduling service 112 facilitates scheduling operation of the compute infrastructure 150. For example, the compute scheduling service 112 can increase or decrease one or more compute resources within the compute infrastructure 150, according to a schedule. As another example, the compute scheduling service 112 can enable operation of one or more compute resources within the compute infrastructure 150 based on an interaction with a user 102 (e.g., at the request of the user 102 or in response to a command from the user 102). These are discussed further below with regard to FIGS. 3-6.

In an embodiment, the compute scheduling service 112 determines the schedule through interaction with an ML scheduling controller 120, a scheduling repository 114, or both. For example, the ML scheduling controller 120 can include an ML scheduling service 122 and a scheduling ML model 124. The ML scheduling service 122 can train the scheduling ML model 124 to determine a schedule for the compute infrastructure 150. This is discussed further, below, with regard to FIG. 7.

The ML scheduling service 122 can further use the scheduling ML model 124 to infer a schedule, and can store the schedule (or aspects of the schedule) in the scheduling repository 114. The compute scheduling service 112 can then retrieve the schedule from the scheduling repository 114. Alternatively, or in addition, the ML scheduling service 122 can provide the schedule to the compute scheduling service 112, directly. This is discussed further, below, with regard to FIGS. 3-7. The scheduling repository 114 can be any suitable electronic repository, including an electronic database (e.g., a relational database, a graph database, or any other suitable electronic database), a cloud computing repository (e.g., a public cloud, a private cloud, or a hybrid cloud), an on-premises repository, or any other suitable electronic repository.

Figure 2:
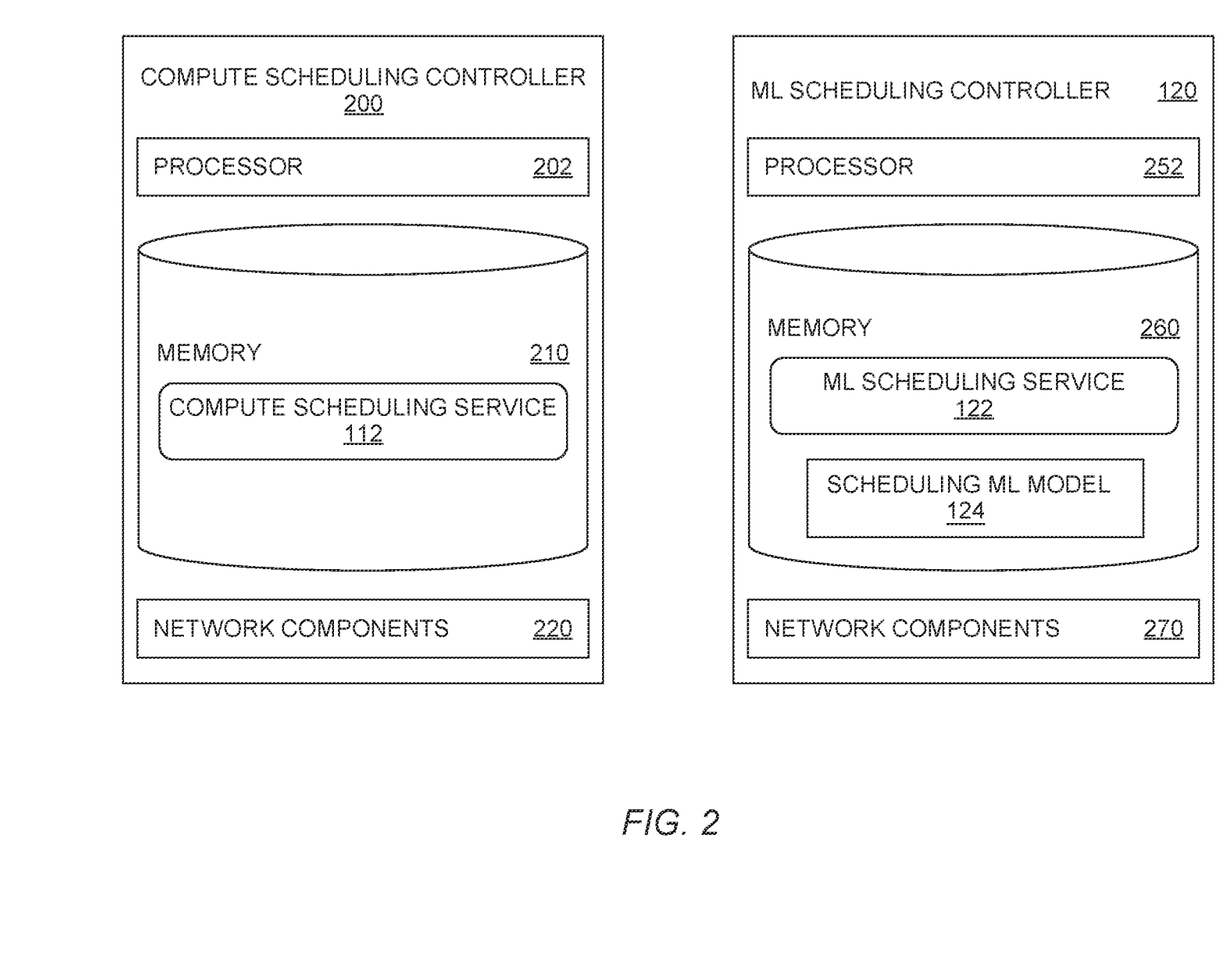
FIG. 2 is a block diagram illustrating controllers for automatic compute environment scheduling using machine learning, according to an embodiment.

FIG. 2 is a block diagram illustrating controllers for automatic compute environment scheduling using machine learning, according to an embodiment. A compute scheduling controller 200 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the compute scheduling controller 200 to interface with a suitable communication network (e.g., a communication network interconnecting various components of the system 100 illustrated in FIG. 1, or interconnecting the system 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the compute scheduling controller 200. The program code is generally described as various functional "applications" or "modules" within the memory 210, although alternate implementations may have different functions and/or combinations of functions. Within the memory 210, the compute scheduling service 112 facilitates scheduling compute resources (e.g., for the compute infrastructure 150 illustrated in FIG. 1). This is discussed further below with regard to FIGS. 3-7.

An ML scheduling controller 120 includes a processor 252, a memory 260, and network components 270. The memory 260 may take the form of any non-transitory computer-readable medium. The processor 252 generally retrieves and executes programming instructions stored in the memory 260. The processor 252 is representative of a single central processing unit (CPU), multiple CPUs, a single CPU having multiple processing cores, graphics processing units (GPUs) having multiple execution paths, and the like.

The network components 270 include the components necessary for the ML scheduling controller 120 to interface with a suitable communication network (e.g., a communication network interconnecting various components of the system 100 illustrated in FIG. 1, or interconnecting the system 100 with other computing systems). For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the ML scheduling controller 120. The program code is generally described as various functional "applications" or "modules" within the memory 260, although alternate implementations may have different functions and/or combinations of functions. Within the memory 260, the ML scheduling service 122 facilitates generating a schedule for compute resources, using the scheduling ML model 124. This is discussed further with regard to FIG. 7, below.

While the compute scheduling controller 200 and the ML scheduling controller 120 are each illustrated as a single entity, in an embodiment, the various components can be implemented using any suitable combination of physical compute systems, cloud compute nodes and storage locations, or any other suitable implementation. For example, the compute scheduling controller 200, the ML scheduling controller 120, or both, could be implemented using a server or cluster of servers. As another example, the compute scheduling controller 200, the ML scheduling controller 120, or both, can be implemented using a combination of compute nodes and storage locations in a suitable cloud environment. For example, one or more of the components of the compute scheduling controller 200, the ML scheduling controller 120, or both, can be implemented using a public cloud, a private cloud, a hybrid cloud, or any other suitable implementation. Further, the compute scheduling controller 200, the ML scheduling controller 120, or both, may include one or more computing platforms, such as computer servers for example, which may be co-located, or may form an interactively linked but distributed system, such as a cloud-based system.

Further, although FIG. 2 depicts the compute scheduling service 112 as being located in the memory 210, and the ML scheduling service 122 and ML model 124 as being located in the memory 260, that representation is also merely provided as an illustration for clarity. More generally, the controllers 200 and 120 may include one or more computing platforms, such as computer servers for example, which may be co-located, or may form an interactively linked but distributed system, such as a cloud-based system. As a result, processors 202 and 252, and memories 210 and 260, may correspond to distributed processor and memory resources within the system 100. Thus, it is to be understood that any, or all, of the compute scheduling service 112, ML scheduling service 122, and ML model 124 may be stored remotely from one another within the distributed memory resources of the system 100.

Figure 3:
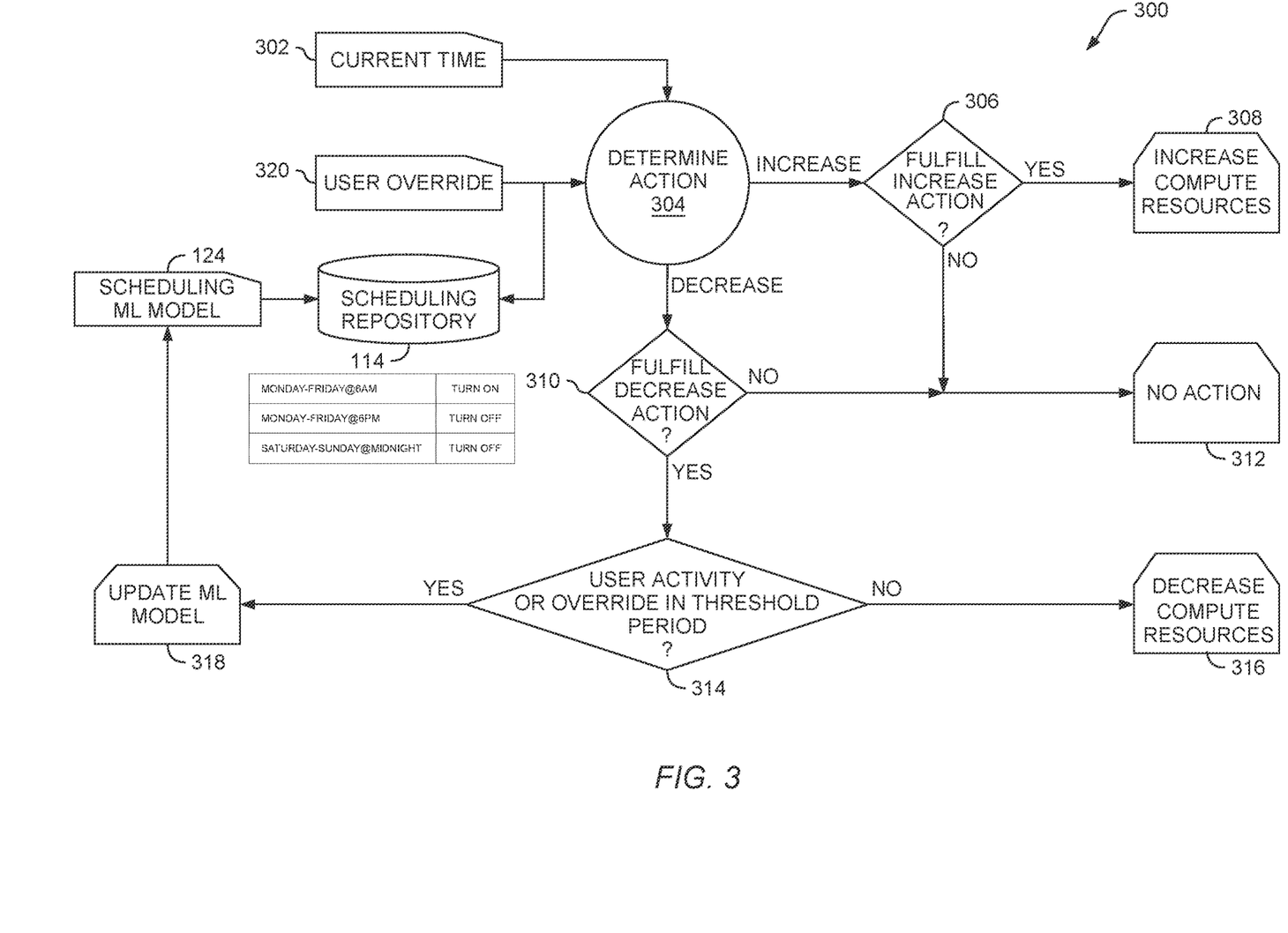
FIG. 3 illustrates a scheduler workflow for automatic compute environment scheduling using machine learning, according to an embodiment.

FIG. 3 illustrates a scheduler workflow 300 for automatic compute environment scheduling using machine learning, according to an embodiment. At block 304, a compute scheduling service (e.g., the compute scheduling service 112 illustrated in FIGS. 1-2) determines an action. For example, the compute scheduling service can trigger a decrease action, which is used to decrease operating compute resources, by shutting down compute resources or scaling down compute resources (e.g., modifying a resource set for compute resources to decrease the active compute resources). As another example, the compute scheduling service can trigger an increase action, which is used to increase operating compute resources, by starting up compute resources or scaling up compute resources (e.g., modifying a resource set for compute resources to increase the active compute resources). Further, the compute scheduling service can determine to trigger no action.

In an embodiment the compute scheduling service receives a current time 302, an indication of user override 320, or both, and uses the received information to determine the action. The compute scheduling service determines an action based on the current time 302, a schedule (e.g., a schedule generated using the scheduling ML model 124 and stored in the scheduling repository 114), and the status of the user override 320. For example, the compute scheduling service can determine based on the current time and a schedule that the current time falls within a period in the schedule when compute resources should be increased (e.g., a time when the compute resources are likely to be used). In an embodiment, the compute scheduling service can use this information at block 304 to trigger an increase action and proceed to block 306.

Alternatively, if the compute scheduling service determines based on the current time and the schedule that the current time does not fall within the period in the schedule when compute resources should be increased, the compute scheduling service can still trigger an increase action. For example, as discussed further below, a user can override a scheduled decrease of compute resources (e.g., using a suitable user interface). The compute scheduling service can respond to an override by declining to decrease compute resources (if the compute resources are currently active) or increasing compute resources (if the compute resources are not active).

At block 304, the compute scheduling service can determine whether a user override 320 indicating a user request to increase compute resources has been received. In response to receiving such a user override 320, the compute scheduling service may determine it is time to increase compute resources, even if the current time does not fall within the period in the schedule when compute resources should be scaled up. If the compute scheduling service determines that it is time to increase compute resources or an override 320 has been received, the compute scheduling service triggers an increase action and the flow proceeds to block 306. In an embodiment, the action determined at block 304 corresponds to a single software service or set of resources, a collection of software services and sets of resources, or any other suitable compute resources.

At block 306, the compute scheduling service determines whether to fulfill the increase action (e.g., whether it is time to increase compute resources). In an embodiment, as part of determining whether to fulfil the increase action, the compute scheduling service can identify the relevant compute resource(s) (e.g., based on the schedule or any other suitable information), and whether the compute resource(s) can be increased (e.g., whether the compute resources are already maximally activated). If the relevant compute resource(s) cannot be increased, the flow proceeds to block 312 and the compute scheduling service takes no action (e.g., it declines to launch compute resources). If the relevant compute resource(s) can be increased, the flow proceeds to block 308.

At block 308, the compute scheduling service increases compute resources. In an embodiment, the compute scheduling service can identify which compute resources should be increased. For example, the user override 320 could indicate a user request to increase compute resources relating to a particular software application or environment. The compute scheduling service can then launch, or scale up, these compute resources. In an embodiment, the compute scheduling service can ensure the user override 320 is genuine, or is suitably approved, before increasing compute resources. For example, the compute scheduling service can ensure that the user override 320 is received from an approved source (e.g., a secure web page or software service). Alternatively, or in addition, the compute scheduling service can increase compute resources without analyzing the user override 320. The compute scheduling service can launch, or scale up, cloud computing resources or on-premises computing resources used for the indicated software application or environment. Further, as discussed above, in an embodiment the compute scheduling service can respond to the user override 320 by restoring the compute resources to a prior operational state. For example, the compute scheduling service can record the operational state when the resources are shut down or scaled down, and can restore the resources to that operational state. Alternatively, or in addition, the compute scheduling service can restore the compute resources to a fresh operational state.

As another example, a schedule (e.g., a schedule maintained in the scheduling repository 114) can indicate which compute resources should be increased at a given time. For example, FIG. 3 illustrates a schedule, stored in the scheduling repository 114, in which compute resources are increased/turned on Monday-Friday at 6 am, and decreased/turned off Monday-Friday at 6 μm and Saturday-Sunday at midnight. This example is merely for illustration, and any suitable schedule and schedule format can be used. The compute scheduling service can use the indication in the schedule to increase suitable compute resources (e.g., cloud computing resources or on-premises compute resources). These are merely examples, and the compute scheduling service can identify compute resources to increase using any suitable technique (e.g., configuration by a user, an application programming interface (API), or any other suitable technique).

The compute scheduling service can increase the relevant compute resources using any suitable technique. For example, the compute scheduling service can interact with a remote API to launch, or scale up, cloud compute resources or can interact with a local service or API to launch, or scale up, on-premises compute resources. These are merely examples, and the compute scheduling service can use any suitable technique.

Returning to block 304, the compute scheduling service can also trigger a decrease action and proceed to block 310. In an embodiment, the compute scheduling service determines whether it is time to decrease compute resources based on the current time 302, a schedule (e.g., a schedule generated using the scheduling ML model 124 and stored in the scheduling repository 114), and the status of the user override 320. For example, the compute scheduling service can determine based on the current time and a schedule that the current time falls within a period in the schedule when compute resources should be decreased (e.g., a time when the compute resources are not likely to be used).

If the compute scheduling service triggers a decrease action, the flow proceeds to block 310. At block 310, the compute scheduling service determines whether to fulfil the decrease action. In an embodiment, as part of determining whether to fulfil the decrease action, the compute scheduling service can identify whether the relevant compute resource(s) can be decreased (e.g., whether the compute resources are already maximally shut down). If the relevant compute resource(s) cannot be decreased, the flow proceeds to block 312 and the compute scheduling service takes no action (e.g., it declines to shut down or scale down compute resources). If the relevant compute resource(s) can be decreased, the flow proceeds to block 314.

At block 314, the compute scheduling service determines whether user activity or a user override has occurred within a threshold time period. In an embodiment, the compute scheduling service identifies which compute resources should be decreased. For example, a schedule (e.g., a schedule maintained in the scheduling repository 114) can indicate which compute resources should be decreased at a given time. The compute scheduling service can use this indication in the schedule to decrease suitable compute resources (e.g., cloud computing resources, on-premises compute resources, or a combination thereof). These are merely examples, and the compute scheduling service can identify compute resources to decrease using any suitable technique (e.g., configuration by a user, an application programming interface (API), or any other suitable technique).

In an embodiment, however, the compute scheduling service decreases the scheduled resources only if the compute resources have not been used within a threshold period (e.g., the previous 10 minutes) and no user override has been received for those resources within a threshold period (e.g., the same threshold used for user activity, or a different threshold). This threshold can be pre-set (e.g., by a system administrator), determined dynamically (e.g., using the trained ML model 124 or another suitable ML model), or determined using any other suitable technique. Further, different thresholds can be used for different compute resources. For example, compute resources that are more critical to keep active can use a shorter threshold compared to compute resources that are less critical to keep active.

In an embodiment, the compute scheduling service can track user activity for the relevant resources, and user overrides for the relevant resources. If no user activity has occurred within the threshold period, and no user override has been received, the flow proceeds to block 316. In an embodiment, one, or both, of the thresholds can be determined dynamically (e.g., using the trained ML model 124), configured by a user, or determined using any other suitable technique.

At block 316 the compute scheduling service decreases the relevant compute resources. As discussed above, the compute scheduling service can identify the compute resources to be decreased at block 314. The compute scheduling service can then decrease the compute resources using any suitable technique. For example, the compute scheduling service can interact with a remote API to shut down cloud compute resources or can interact with a local service or API to shut down on-premises compute resources. These are merely examples, and the compute scheduling service can use any suitable technique.

Returning to block 314, if the compute scheduling service determines that user activity, or a user override, has occurred within the threshold period for the relevant services, the flow proceeds to block 318.

At block 318, the compute scheduling service takes no action on the compute resources (e.g., it declines to decrease compute resources). Instead, the compute scheduling service re-trains or initiates a re-training of the ML model to update the ML model. For example, user activity or a user override within the threshold period of the scheduled decrease can indicate flaws in the trained ML model 124 (e.g., the scheduling ML model 124 illustrated in FIGS. 1-2). The compute scheduling service can interact with an ML scheduling service (e.g., the ML scheduling service 122 illustrated in FIGS. 1-2) to update the scheduling ML model 124.

For example, the compute scheduling service can transmit a request to the ML scheduling service to update the scheduling ML model 124, with an indication of the user override or user activity that occurred within the threshold period. The ML scheduling service can then use the override or activity as additional training data to update the trained ML Model 124. In an embodiment, the ML scheduling service does not retrain the ML model after every update (e.g., after every user override or user activity occurring within the threshold period). For example, the ML scheduling service can wait until receiving a threshold number of updates, can wait a specific duration of time, or can wait until an expected downtime to update the ML model.

In an embodiment, as part of updating the ML model, the ML scheduling service uses the scheduling ML model 124 to revise a schedule maintained in the scheduling repository. For example, the ML scheduling service can update the scheduling ML model 124 (e.g., re-train the scheduling ML model 124 or provide additional training for the scheduling ML model), and then can use the scheduling ML model 124 to generate an updated schedule for launching and shutting down compute resources. The ML scheduling service can store this updated schedule in the scheduling repository 114.

Figure 4:
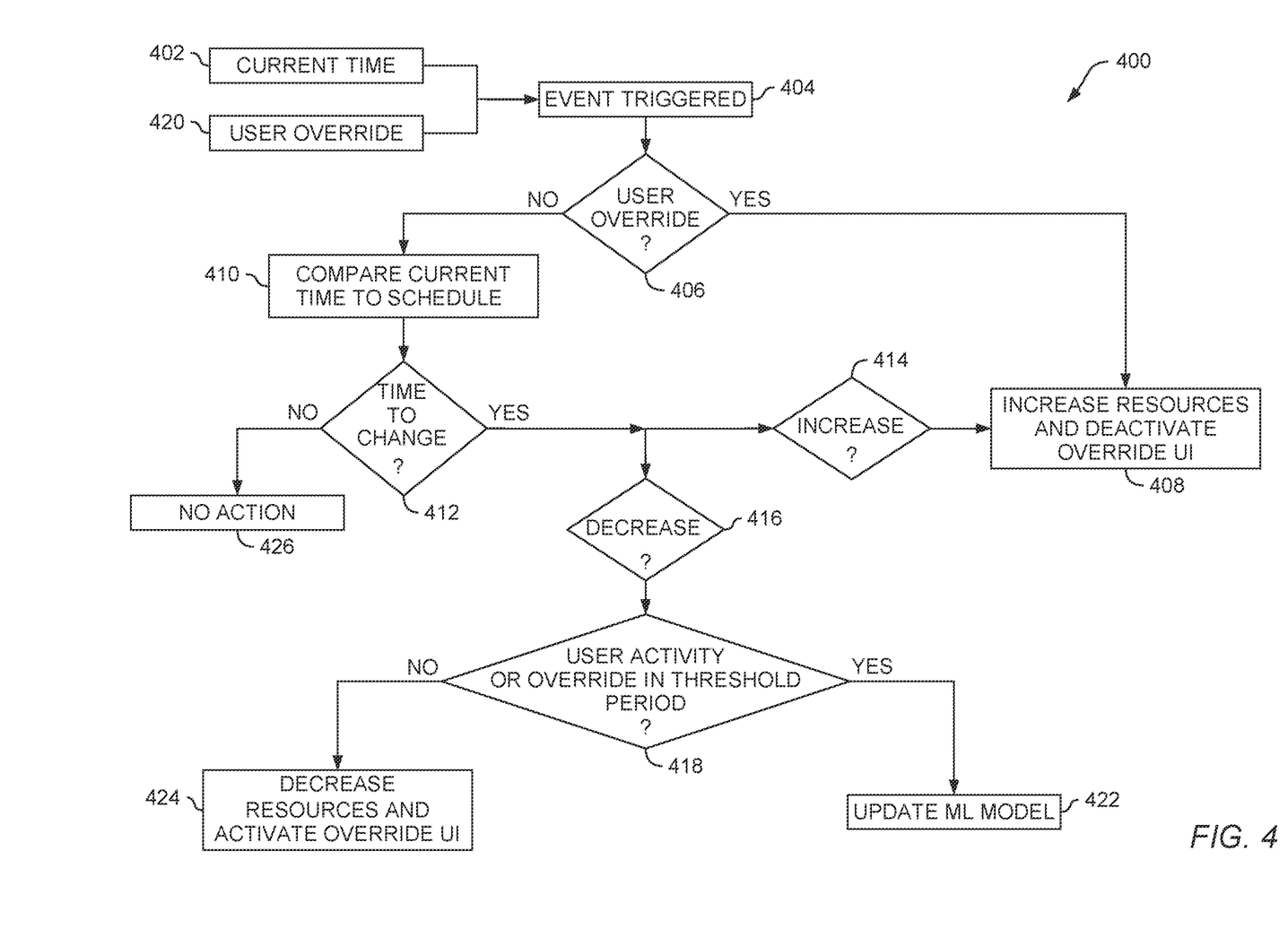
FIG. 4 illustrates a further scheduler workflow for automatic compute environment scheduling using machine learning, according to an embodiment.

FIG. 4 illustrates a further scheduler workflow 400 for automatic compute environment scheduling using machine learning, according to an embodiment. In an embodiment, FIG. 4 describes a further example workflow with additional aspects of automatic compute environment scheduling using machine learning. At block 404, an event (e.g., a compute scheduling event) is triggered for a compute scheduling service (e.g., the compute scheduling service 112 illustrated in FIGS. 1-2). In an embodiment, this event relates to a current time 402 or a user override 420. These are merely examples, and the event can relate to any suitable occurrence. Further, in an embodiment, a compute scheduling event can be used to determine an increase or decrease action, as discussed in relation to at block 304 illustrated in FIG. 3.

For example, the current time 402 can periodically trigger an event at block 404. The compute scheduling service can intermittently check the current time (e.g., at a defined interval), generate, and process an event. In an embodiment, this interval can be defined by a user (e.g., an administrator). Alternatively, this interval can be defined automatically (e.g., using the scheduling ML model 124 illustrated in FIGS. 1-2, any other suitable ML model, or any other suitable technique). Further, this interval can change dynamically during operation (e.g., based on updates to the ML model). In an embodiment, the event is triggered intermittently (e.g., at the defined interval) with no regard for the compute resources schedule discussed below with regard to block 410.

In an embodiment, the interval can be determined automatically (either static or dynamically) based on numerous factors, including the compute resource costs associated with waiting to decrease compute resources, changes in network or compute usage, or any other suitable factors. The interval can be determined based on balancing the compute costs associated with frequent events against the compute costs associated with waiting longer to decrease unneeded compute resources (or increase needed compute resources). For example, higher resource costs or higher network or compute usage could indicate more frequent intervals, while lower resource costs or lower network or compute usage could indicate less frequent intervals.

As another example, a user override 420 can trigger an event at block 404. A user can indicate that compute resources (e.g., compute resources for a particular project or module) should be enabled. This can trigger an event for the compute scheduling service. In an embodiment, a user can provide the user override 420 using a suitable user interface (UI). For example, the user can select compute resources to be increased (e.g., restored). This can be done based on project, module, compute resource location (e.g., cloud location or on-premises location) or based on any other suitable factor. This is merely an example. Alternatively, or in addition, the user could be presented with a UI that automatically designates compute resources appropriate for that user (e.g., a project, module, or compute resource location associated with that user). The user could then choose to override the prior decrease and increase the compute resources, or not, depending on the user's needs.

At block 406, the compute scheduling service determines whether the event is a user override (e.g., the event comes from a user override 420). If so, the flow proceeds to block 408.

At block 408, the compute scheduling service increases compute resources and deactivates the override user interface (UI). In an embodiment, the user override 420 is triggered by a suitable UI (e.g., a web page, software application, command line interface, or any other suitable UI). For example, the compute scheduling service can activate compute resources that were previously shut down or scaled down. In an embodiment, the compute scheduling service can identify the compute resources to increase (e.g., restore) based on the event triggered at block 404 (e.g., based on a suitable field or aspect of the event) or based on any other suitable information. As discussed above, the compute scheduling service can increase compute resources using any suitable technique, including an API call (e.g., to a cloud provider or on-premises resource manager), a network message, or any other suitable technique.

Further, the compute scheduling service can modify the UI used for the user override, to deactivate the interface for the increased compute resources. Because these compute resources are now enabled, user override is no longer needed or permitted. In an embodiment, the compute scheduling service modifies the UI to permit the user to override shutdown or scale down and increase compute resources that remain shut down, while deactivating override for resources that have been restored. This could be done through a dropdown menu, check boxes, a listing, or any other suitable UI. Further, the UI can be a graphical interface, a command line interface, or any other suitable interface.

Returning to block 406, if the event triggered at block 404 is not a user override, the flow proceeds to block 410. At block 410, the compute scheduling service compares the current time (e.g., the current time 402) to a schedule. As discussed above in relation to FIG. 3, in an embodiment a schedule for decrease of compute resources is maintained at a scheduling repository (e.g., the scheduling repository 114 illustrated in FIGS. 1 and 3). This is merely an example, and the schedule can be maintained in any suitable location (e.g., a local repository for the compute scheduling service, a remote repository accessible via an API, or any other suitable location). Further, the schedule can be generated, or modified, dynamically.

At block 412, the compute scheduling service determines whether it is time to change compute resources (e.g., increase or decrease compute resources). In an embodiment, the compute scheduling service determines whether the active compute resources should change (e.g., compute resources should be decreased or increased), based on the current time 402 and the schedule. For example, the compute scheduling service can determine that the current time falls within a period scheduled for shut down or scale down of certain compute resources, and can determine that the compute resources are currently active. As another example, the compute scheduling service can determine that the current time falls within a period scheduled for restoration (e.g., start up or scale up) of previously shut down or scaled down compute resources, and can determine that the compute resources are currently shut down or scaled down. As another example, the compute scheduling service can determine that the current time and schedule do not indicate a change in active compute resources (e.g., active compute resources should remain active and shut down compute resources should remain shut down). If the compute scheduling service determines that compute resources should be changed (e.g., increased or decreased), the flow proceeds to one of blocks 414 and 416, depending on whether the change is an increase or decrease.

At block 414, the compute scheduling service determines whether compute resources should be increased. For example, as discussed above, the compute scheduling service can determine that the current time falls within a period scheduled for restoration of previously shut down or scaled down compute resources, and can determine that the compute resources are currently shut down or scaled down. The flow can then proceed to block 408. As discussed above, at block 408 the compute scheduling service increases compute resources and deactivates the override UI.

At block 416, the compute scheduling service determines whether compute resources should be decreased. For example, as discussed above, the compute scheduling service can determine that the current time falls within a period scheduled for shut down or scale down of certain compute resources, and can determine that the compute resources are currently active. The flow can then proceed to block 418.

At block 418, the compute scheduling service determines whether user activity or override has occurred within a threshold period. As discussed above in relation to block 314 illustrated in FIG. 3, in an embodiment the compute scheduling service decreases compute resources only if the compute resources have not been used within a threshold period (e.g., the previous 10 minutes) and no user override has been received for those compute resources within a threshold period (e.g., the same threshold used for user activity, or a different threshold). If user activity or a user override have occurred within the threshold period, for the relevant compute resources, the flow proceeds to block 422.

At block 422, the compute scheduling service updates the ML model and takes no action with respect to decreasing compute resources. As discussed above in relation to block 318 illustrated in FIG. 3, user activity or a user override within the threshold period of the scheduled decrease can indicate flaws in an ML model (e.g., the scheduling ML model 124 illustrated in FIGS. 1-2). The compute scheduling service can interact with an ML scheduling service (e.g., the ML scheduling service 122 illustrated in FIGS. 1-2) to update the ML model.

Returning to block 418, if the compute scheduling service determines that no user activity or override has occurred within the threshold period (e.g., for the relevant compute resources), the flow proceeds to block 424. At block 424 the compute scheduling service decreases compute resources (e.g., the relevant compute resources) and activates the override UI.

For example, the compute scheduling service can decrease active compute resources. In an embodiment, the compute scheduling service can identify the compute resources to decrease based on the event triggered at block 404 (e.g., based on a suitable field or aspect of the event) or based on any other suitable information. As discussed above, the compute scheduling service can decrease compute resources using any suitable technique, including an API call (e.g., to a cloud provider or on-premises resource manager), a network message, or any other suitable technique.

Further, the compute scheduling service can modify the UI used for the user override, to enable the interface for the restored compute resources. Because these resources are now decreased (e.g., shut down or scaled down), user override is permitted. In an embodiment, the compute scheduling service modifies the UI to permit the user to override shutdown for resources that are shut down, while leaving deactivated the override UI for resources that remain active.

Returning to block 412, if the compute scheduling service determines that it is not time to scale (e.g., no resources should be increased or decreased), the flow proceeds to block 426. At block 426, the compute scheduling service takes no action (e.g., it does not increase or decrease compute resources or modify the override UI).

Figure 5:
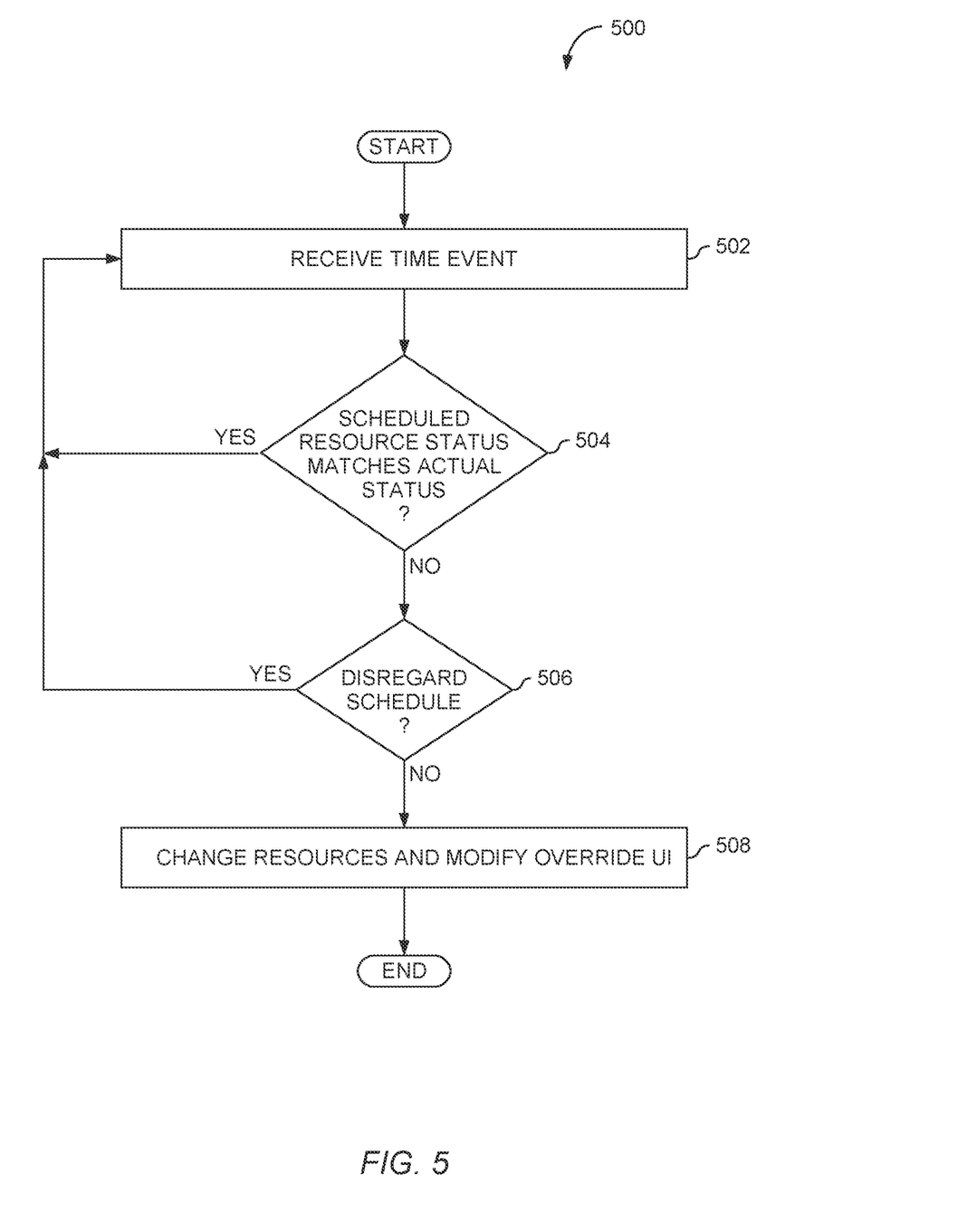
FIG. 5 is a flowchart illustrating receiving a time event for automatic compute environment scheduling using machine learning, according to an embodiment.

FIG. 5 is a flowchart 500 illustrating receiving a time event for automatic compute environment scheduling using machine learning, according to an embodiment. At block 502, a compute scheduling service (e.g., the compute scheduling service 112 illustrated in FIGS. 1-2) receives a time event. As discussed above in relation to block 404 illustrated in FIG. 4, in an embodiment the compute scheduling service receives an event reflecting the current time. For example, the compute scheduling service (or another suitable software service) can intermittently check the current time (e.g., at a defined interval), generate, and process an event. As noted, this interval can be any suitable period, and can be determined by a user or set automatically, can be static or dynamic (e.g., changing during operation of the compute scheduling service), or can use any other suitable technique.

At block 504, the compute scheduling service determines whether the scheduled resource status (e.g., scheduled to be active or shut down) of a compute resource matches the actual status of the compute resource. For example, as discussed above in relation to blocks 410 and 412 illustrated in FIG. 4, the compute scheduling service can compare the current time with a compute resource schedule, and can determine whether a compute resource (e.g., a compute resource specified in the time event received at block 502) is scheduled to be active or shut down.

The compute scheduling service can then determine an actual status of the compute resource (e.g., whether the compute resource is actually active or shut down). In an embodiment, the compute scheduling service queries the compute resource for its current status (e.g., using an API or a network message). Alternatively, or in addition, the compute scheduling service maintains a record of the expected status of the compute resource. For example, the compute scheduling service can maintain a list of active resources, shut down resources, scaled down resources, or any or all of the above. These are merely examples, and the compute scheduling service can use any suitable technique. If the scheduled resource status matches the actual status, then no change is necessary and the flow returns to block 502. If the scheduled resource status matches the actual status, the flow proceeds to block 506.

At block 506, the compute scheduling service determines whether to disregard the schedule. In an embodiment, as discussed above in relation to block 418 illustrated in FIG. 4, the compute scheduling service disregards the schedule (e.g., declines to decrease a compute resource at a scheduled decrease time) if user activity or a user override has occurred within a threshold time period. If the compute scheduling service disregards the schedule (e.g., declines to decrease compute resources because user activity or a user override has recently occurred), the flow returns to block 502. If the compute scheduling service does not disregard the schedule, the flow proceeds to block 508.

At block 508, the compute scheduling service changes resources and modifies an override UI. In an embodiment, as discussed above in relation to block 408 illustrated in FIG. 4, the compute scheduling service can increase compute resources and deactivate the override UI. For example, if the schedule and time event indicate that resources should be active, but the compute resources are currently shut down, the compute scheduling service restores the compute resources. The compute scheduling service further deactivates the override UI (e.g., for the relevant compute resources).

Further, as discussed above in relation to block 424 illustrated in FIG. 4, the compute scheduling service can shut down or scale down resources and activate the override UI. For example, if the schedule and time event indicate that resources should be decreased, but the compute resources are currently active, the compute scheduling service shuts down or scales down the compute resources. The compute scheduling service further activates the override UI (e.g., for the relevant compute resources).

In an embodiment, the compute scheduling service can further use a graph of compute resource dependencies to scale compute resources. For example, different software applications and modules can be dependent on each other. A particular software module (e.g., an authentication module) may be used by other applications and modules (e.g., called by a large number of other applications and modules). This can be indicated by a dependency graph. The compute scheduling service can determine that all applications and modules that use the authentication module have had their compute resources shut down (e.g., using the dependency graph), and can in turn shut down compute resources for the authentication model.

Similarly, the compute scheduling service can determine that an application or module that uses the authentication module has had its compute resources increased, and can in turn increase compute resources for the authentication module as well (along with compute resources for any other modules used by the newly restored compute resources). In an embodiment, the dependency graph (or any other suitable indication of dependencies) is provided by an administrator. Alternatively, or in addition, the dependency graph can be generated or modified automatically (e.g., using a suitable ML model or other software technique).

Further, compute resources can be scaled regionally. A particular geographic region may use compute resources from a particular compute infrastructure (e.g., a cloud provider or on-premises provider located close to, or in, that region). In an embodiment, the compute scheduling service can independently scale compute resources for any region. For example, a schedule could indicate that compute resources should be decreased, or increased, for different regions at different times (e.g., based on expected working hours because of differences in time zones). Similarly, a user override could increase compute resources only for the region in which the user is located.

Figure 6:
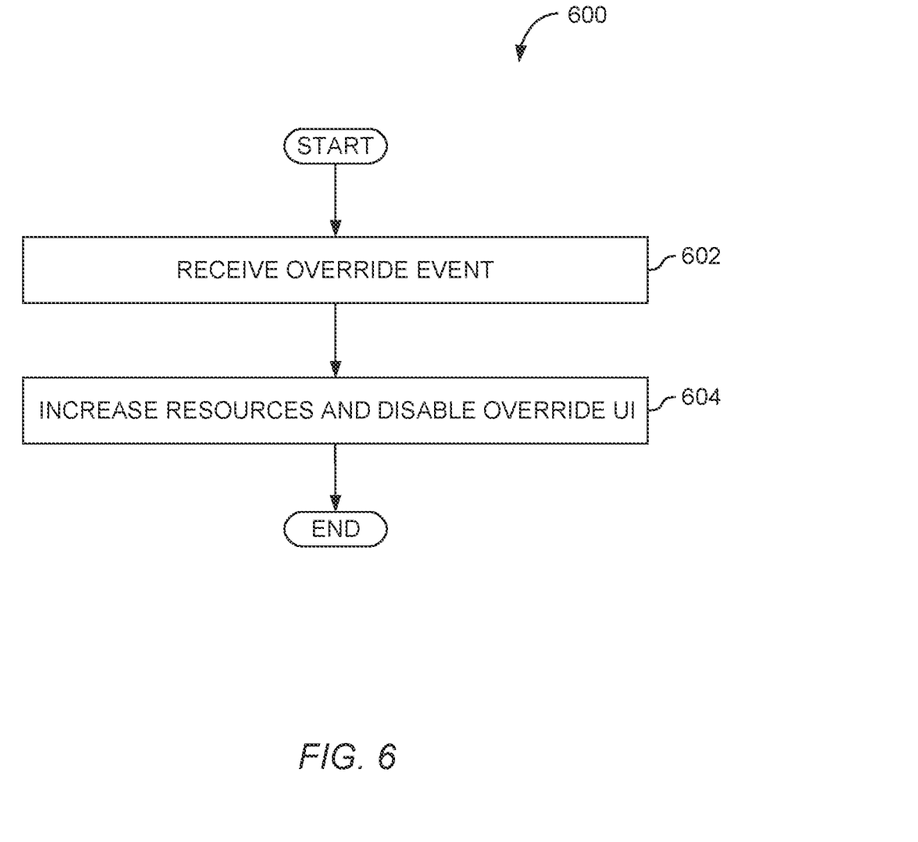
FIG. 6 is a flowchart further illustrating receiving an override event for automatic compute environment scheduling using machine learning, according to an embodiment.

FIG. 6 is a flowchart 600 further illustrating receiving an override event for automatic compute environment scheduling using machine learning, according to an embodiment. At block 602, a compute scheduling service (e.g., the compute scheduling service 112 illustrated in FIGS. 1-2) receives an override event. As discussed above in relation to blocks 404 and 406 illustrated in FIG. 4, in an embodiment the compute scheduling service can receive an event indicating that a user has requested to override the scheduling.

For example, the user can use a UI (e.g., the override UI discussed above in relation to FIG. 4) to request activating a compute resource that is currently shut down.

At block 604, the compute scheduling service increases compute resources and deactivates an override UI. As discussed above in relation to block 408 illustrated in FIG. 4, in an embodiment a compute scheduling service can respond to a user override by restoring resources (e.g., resources indicated by the user). The compute scheduling service can further deactivate the override UI, since the compute resources are now active.

Figure 7:
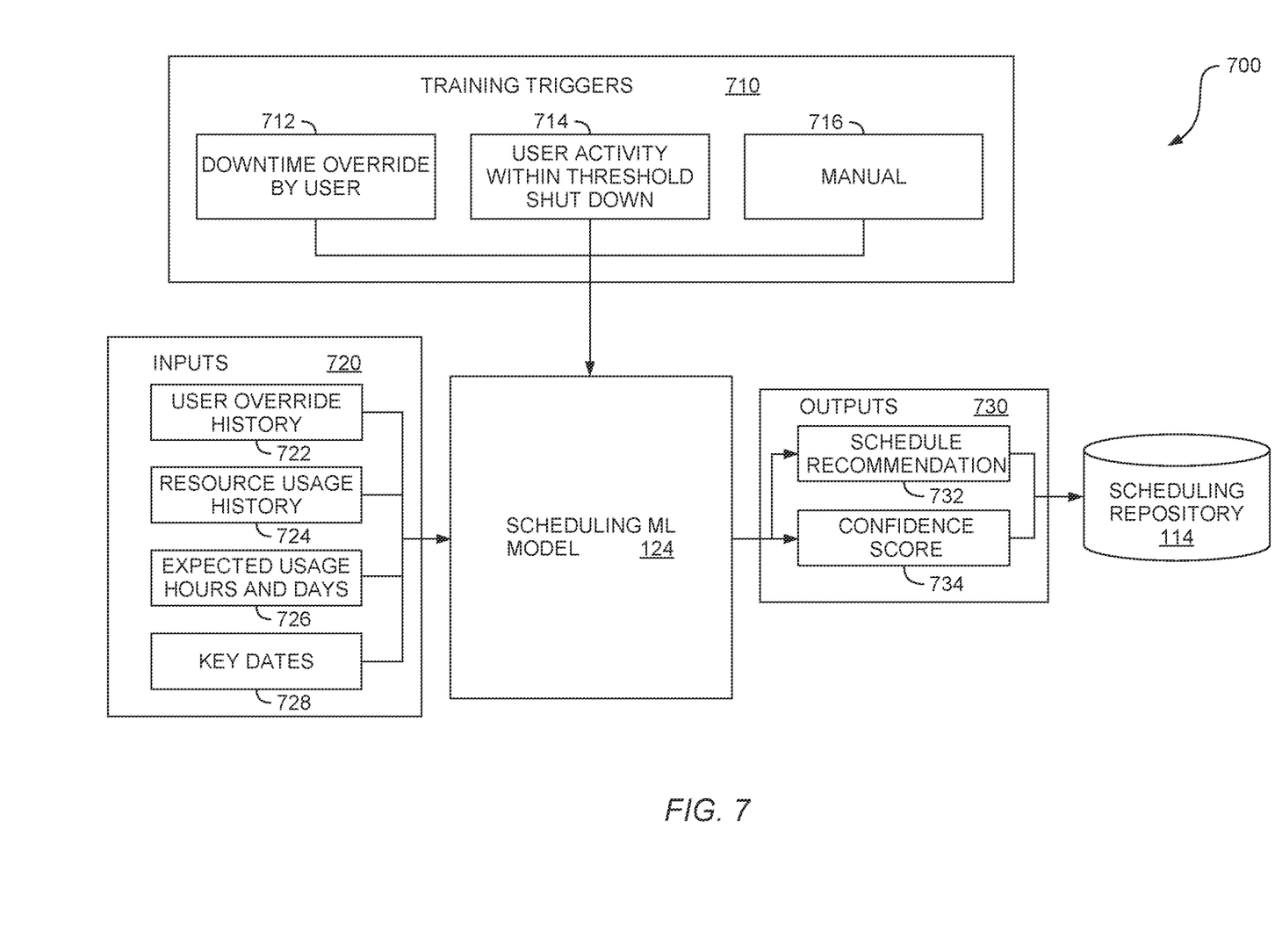
FIG. 7 is a block diagram illustrating machine learning (ML) for automatic compute environment scheduling, according to an embodiment

FIG. 7 is a block diagram 700 illustrating machine learning for automatic compute environment scheduling, according to an embodiment. In an embodiment, a scheduling ML model 124 is trained to use a number of inputs 720 to generate outputs 730. The scheduling ML model 124 can be any suitable supervised ML model. For example, the scheduling ML model 124 can be a suitable deep learning neural network (DNN). This is merely an example, and any suitable ML model can be used.

In an embodiment, the scheduling ML model can be trained using suitable training data. For example, training data (e.g., data relating to historical compute resource usage and scheduling) can be pre-processed to generate feature vectors reflecting the values of various features in the training data. The feature vectors can be used to train the scheduling ML model.

In an embodiment, several training triggers 710 can trigger training of the scheduling ML model 124. This can include initial training, or ongoing training to update the scheduling ML model 124. For example, a manual input 716 (e.g., from an administrator) can trigger initial training of the scheduling ML model 124, or training to update the scheduling ML model.

In an embodiment, the scheduling ML model 124 can be initially trained using general training data, and can be updated based on actual usage data for the compute resources (e.g., user overrides and user activity). Further, as discussed above in relation to block 318 illustrated in FIG. 3 and block 422 illustrated in FIG. 4, the scheduling ML model 124 can be triggered to be updated by downtime overrides by a user 712 or user activity within a threshold before shut down 714. These are merely examples, and any suitable triggers can be used. In an embodiment, downtime overrides and user activity patterns can be recorded, and used both to trigger additional training to update the scheduling ML model 124 and as training data in the additional training. Thus, the scheduling ML model continues to improve as it is refined through intermittent updates.

In an embodiment, the scheduling model 124 infers the outputs 730 based on the inputs 720. The inputs 720 can include any suitable information relating to scheduling compute resources. For example, the inputs 720 can include user override history 722, resource usage history 724, expected usage hours and days 726, and key dates 728. In an embodiment, these inputs can further indicate a geographic region, and the scheduling ML model 124 can infer outputs 730 on a region-by-region basis.

In an embodiment, the user override history 722 reflects previous user overrides (e.g., times and days when users have chosen to override shut down or scale down and restore resources). The resource usage history 724 reflects the history of compute resource usage (e.g., activity for the compute resources over time). In an embodiment, the resource usage history 724 relates to a given period of time (e.g., four weeks). This period of time can be determined manually, or automatically (e.g., using the scheduling ML model 124 or another suitable ML model). Each of the user override history 722 and the resource usage history 724 can relate to the compute resources being scheduled by the scheduling ML model 124, similar resources, both, or any suitable resources.

The expected usage hours and days 726 reflect time periods when compute resources are expected to be used. For example, if the compute resources relate to a development and testing environment for a software application, the expected usage hours and days 726 can reflect the business hours and days for the development team(s) working on the software application. This can include all relevant time zones. Further, the expected usage hours and days 726 can vary over time (e.g., as development comes closer to release and more usage is expected). As another example, if the compute resources relate to use of compute resources (e.g., customer use), the expected usage hours and days 726 can reflect times when customers are expected to use the compute resources.

The key dates 728 can reflect dates that are expected to impact usage of the compute resources. For example, the key dates 728 can include holidays (e.g., when usage of compute resources is expected to decrease), release dates (e.g., when usage of compute resources for development and testing is expected to increase), fiscal year dates, and any other suitable dates.

The outputs 730 include a schedule recommendation 732 and a confidence score 734. In an embodiment, an ML scheduling service (e.g., the ML scheduling service 122 illustrated in FIGS. 1-2) uses the scheduling ML model 124 to infer a schedule recommendation 732. This schedule recommendation 732 can be stored in a scheduling repository 114. This is merely an example, and the scheduling recommendation 732 can be stored in any suitable location (or generated on the fly). Further, the schedule recommendation can indicate schedules by region, to allow a compute scheduling service to scale compute resources on a region-by-region basis.

In an embodiment, the ML scheduling service uses the scheduling ML model 124 to generate a confidence score 734. For example, the confidence score 734 can reflect a confidence in the accuracy of the schedule recommendation. The confidence score 734 can also be stored in the scheduling repository.

In an embodiment the ML scheduling service, a compute scheduling service (e.g., the compute scheduling service 112 illustrated in FIGS. 1-2), or both, use the confidence score when determining whether to scale compute resources. For example, the compute scheduling service can consider the confidence score when deciding whether to decrease, or increase, compute resources. A high confidence score can reflect a high degree of confidence in the schedule recommendation, while a low confidence score can reflect a low degree of confidence in the schedule recommendation.

In an embodiment, the compute scheduling service can require a threshold confidence score 734 before scaling compute resources, regardless of the schedule recommendation 732. Alternatively, or in addition, the ML scheduling service can use the confidence score to generate, or modify, the schedule recommendation. For example, the ML scheduling service can decline to replace an existing schedule (e.g., stored in the scheduling repository 114) with an updated schedule if the confidence score is below a threshold. These thresholds can be determined manually (e.g., by an administrator) or automatically (e.g., using the scheduling ML model 124 or another suitable ML model or software techniques).

One or more techniques disclosed above are discussed in the context of scaling compute resources. This is merely an example. These techniques, or similar techniques, can be used for a variety of contexts. For example, the scheduling ML model 124 could be used to identify a schedule for when compute resources are likely to be available for maintenance. In an embodiment, times when compute resources are suitable for decrease, are also times when maintenance can be performed with minimal impact. The scheduling ML model 124 could generate a schedule of preferred maintenance windows for compute resources, in addition to or instead of times to scale compute resources.

Further, the scheduling ML model 124 could be used to determine when to move compute resources between compute infrastructure. For example, on-premises infrastructure could be cheaper to operate but less robust for large volumes of activity. Similarly, different cloud compute infrastructure could offer different tradeoffs between expense and ability to handle large volumes of activity. In addition to, or instead of, determining when compute resources should be changed (e.g., decreased or increased), the scheduling ML model could be used to determine when a particular software application or development environment should be moved between compute infrastructure (e.g., moved between cloud providers or between on-premises compute infrastructure and cloud infrastructure).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    identifying a first compute resource among a plurality of compute resources operating in a compute infrastructure, wherein the first compute resource is in a first operational state;
    determining, based on comparing a first time with a compute resources schedule generated using a machine learning (ML) model, that the first compute resource should be placed in a second operational state different from the first operational state;
    determining whether the compute resources schedule should be disregarded; and
    (1) in response to determining that the compute resources schedule should not be disregarded, placing the first compute resource in the second operational state and automatically modifying a disabled state of a first portion of a user interface to enable overriding of the first compute resource being placed in the second operational state while maintaining a disabled state of a second portion of the user interface that enables overriding associated with other compute resources, or
    (2) in response to determining that the compute resources schedule should be disregarded, allowing the first compute resource to remain in the first operational state and maintaining the disabled state of the first portion of the user interface and the second portion of the user interface.

2. The method of claim 1, further comprising:
    identifying that the first compute resource is in the second operational state;
    determining, based on comparing a second time with the compute resources schedule generated using the ML model, that the first compute resource should be placed in the first operational state, wherein the second time is after the first time; and
    placing the first compute resource in the first operational state.

3. The method of claim 1,
    wherein the first operational state is activated and the second operational state is deactivated, or
    wherein the first operational state is deactivated and the second operational state is activated.

4. The method of claim 1, wherein determining that the schedule should be disregarded comprises:
    determining at least one of:
        occurrence of user activity for the first compute resource within a first threshold time period before the first time; or
        reception of a user override within a second threshold time period before the first time.

5. The method of claim 4, further comprising:
    updating the ML model based on the at least one of the user activity or the user override, wherein updating the ML model comprises:
        training the ML model using additional training data including the at least one of the user activity or the user override; and
        generating a second compute resources schedule using the updated ML model.

6. The method of claim 1, further comprising:
    identifying that the first compute resource is in the second operational state;
    receiving an indication of a user override relating to the first compute resource; and
    restoring the first compute resource to the first operational state, based on the received indication.

7. The method of claim 6, further comprising:
    disabling the first portion of the user interface for the user override relating to the first compute resource, based on the restoring the first compute resource to the first operational state, wherein the indication of the user override is received using the user interface.

8. The method of claim 1, further comprising:
    identifying, based on the first compute resource and a dependency graph, a second compute resource to be placed in the second operational state.

9. The method of claim 8, wherein identifying, based on the first compute resource and the dependency graph, the second compute resource to be placed in the second operation state, further comprises:
    determining, based on the dependency graph, that a first software module associated with the first compute resource uses a second software module associated with the second compute resource; and
    determining, based on the dependency graph, that no other software modules that use the second software module remain in the first operational state.

10. The method of claim 1, wherein the plurality of compute resources operating in the compute infrastructure comprises at least one of: (i) a plurality of cloud computing resources, or (ii) a plurality of on-premises computing resources.

11. A non-transitory computer-readable medium containing computer program code that, when executed by operation of one or more computer processors, performs operations comprising:
    identifying a first compute resource among a plurality of compute resources operating in a compute infrastructure, wherein the first compute resource is in a first operational state;
    determining, based on comparing a first time with a compute resources schedule generated using a machine learning (ML) model, that the first compute resource should be placed in a second operational state different from the first operational state;
    determining whether the compute resources schedule should be disregarded; and
    (1) in response to determining that the compute resources schedule should not be disregarded, placing the first compute resource in the second operational state and automatically modifying a disabled state of a first portion of a user interface to enable overriding of the first compute resource being placed in the second operational state while maintaining a disabled state of a second portion of the user interface that enables overriding associated with other compute resources, or
    (2) in response to determining that the compute resources schedule should be disregarded, allowing the first compute resource to remain in the first operational state and maintaining the disabled state of the first portion of the user interface and the second portion of the user interface.

12. The non-transitory computer-readable medium of claim 11, the operations further comprising:
identifying that the first compute resource is in the second operational state;
determining, based on comparing a second time with the compute resources schedule generated using the ML model, that the first compute resource should be placed in the first operational state, wherein the second time is after the first time; and
placing the first compute resource in the first operational state.

13. The non-transitory computer-readable medium of claim 11,
wherein the first operational state is activated and the second operational state is deactivated, or
wherein the first operational state is deactivated and the second operational state is activated.

14. The non-transitory computer-readable medium of claim 11, wherein determining that the schedule should be disregarded comprises:
determining at least one of:
occurrence of user activity for the first compute resource within a first threshold time period before the first time; or
reception of a user override within a second threshold time period before the first time.

15. The non-transitory computer-readable medium of claim 14, the operations further comprising:
updating the ML model based on the at least one of the user activity or the user override, wherein updating the ML model comprises:
training the ML model using additional training data including the at least one of the user activity or the user override; and
generating a second compute resources schedule using the updated ML model.

16. The non-transitory computer-readable medium of claim 11, the operations further comprising:
identifying, based on the first compute resource and a dependency graph, a second compute resource to be placed in the second operational state, comprising:
determining, based on the dependency graph, that a first software module associated with the first compute resource uses a second software module associated with the second compute resource; and
determining, based on the dependency graph, that no other software modules that use the second software module remain in the first operational state.

17. A system, comprising:
a computer processor; and
a memory having instructions stored thereon which, when executed on the computer processor, performs operations comprising:
identifying a first compute resource among a plurality of compute resources operating in a compute infrastructure, wherein the first compute resource is in a first operational state;
determining, based on comparing a first time with a compute resources schedule generated using a machine learning (ML) model, that the first compute resource should be placed in a second operational state different from the first operational state;
determining whether the compute resources schedule should be disregarded; and
(1) in response to determining that the compute resources schedule should not be disregarded, placing the first compute resource in the second operational state and automatically modifying a disabled state of a first portion of a user interface to enable overriding of the first compute resource being placed in the second operational state while maintaining a disabled state of a second portion of the user interface that enables overriding associated with other compute resources, or
(2) in response to determining that the compute resources schedule should be disregarded, allowing the first compute resource to remain in the first operational state and maintaining the disabled state of the first portion of the user interface and the second portion of the user interface.

18. The system of claim 17, the operations further comprising:
identifying that the first compute resource is in the second operational state;
determining, based on comparing a second time with the compute resources schedule generated using the ML model, that the first compute resource should be placed in the first operational state, wherein the second time is after the first time; and
placing the first compute resource in the first operational state.

19. The system of claim 17, wherein determining that the schedule should be disregarded comprises:
determining at least one of:
user activity occurred for the first compute resource within a first threshold time period before the first time; or
a user override was received within a second threshold time period before the first time, the operations further comprising:
updating the ML model based on the at least one of user activity occurring for the first compute resource or the user override, wherein updating the ML model comprises:
training the ML model using additional training data including the at least one of the user activity or the user override; and
generating a second compute resources schedule using the updated ML model.

20. The system of claim 17, the operations further comprising:
identifying, based on the first compute resource and a dependency graph, a second compute resource to be placed in the second operational state, comprising:
determining, based on the dependency graph, that a first software module associated with the first compute resource uses a second software module associated with the second compute resource; and
determining, based on the dependency graph, that no other software modules that use the second software module remain in the first operational state.

* * * * *